US009917788B2

(12) United States Patent
Boynes

(10) Patent No.: US 9,917,788 B2
(45) Date of Patent: Mar. 13, 2018

(54) SPECULATIVE GENERATION OF NETWORK PAGE COMPONENTS

(71) Applicant: Amazon Technologies, Inc., Seattle, WA (US)

(72) Inventor: Jeremy Boynes, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 417 days.

(21) Appl. No.: 14/523,318

(22) Filed: Oct. 24, 2014

(65) Prior Publication Data

US 2015/0046596 A1    Feb. 12, 2015

Related U.S. Application Data

(63) Continuation of application No. 13/400,287, filed on Feb. 20, 2012, now Pat. No. 8,874,641.

(60) Provisional application No. 61/533,889, filed on Sep. 13, 2011.

(51) Int. Cl.
*H04L 12/911* (2013.01)
*G06F 17/30* (2006.01)

(52) U.S. Cl.
CPC ........ *H04L 47/70* (2013.01); *G06F 17/30899* (2013.01)

(58) Field of Classification Search
CPC .......... G06F 17/30902; G06F 17/3089; G06F 17/30905; G06F 3/0481; G06Q 30/02; G06Q 30/0254; G06Q 30/0255; G06Q 30/0256; G06Q 30/0271; G06Q 30/0631; H04L 67/2842; H04L 67/1012; H04L 67/306

USPC ................. 709/201–203, 223, 226, 200, 248
See application file for complete search history.

(56) References Cited

U.S. PATENT DOCUMENTS

| | | | | |
|---|---|---|---|---|
| 6,237,022 B1* | 5/2001 | Bruck | ..................... | H04L 29/06 709/200 |
| 6,317,780 B1* | 11/2001 | Cohn | ................ | G06F 17/30902 707/E17.12 |
| 6,622,168 B1* | 9/2003 | Datta | ................ | G06F 17/30902 707/E17.12 |
| 6,704,873 B1* | 3/2004 | Underwood | ............ | H04L 63/02 709/223 |
| 6,757,724 B1* | 6/2004 | Fields | ............... | G06F 17/30867 707/999.1 |
| 6,853,982 B2* | 2/2005 | Smith | .................... | G06Q 30/02 705/26.7 |
| 7,624,047 B1* | 11/2009 | Round | ..................... | G06F 9/50 705/26.1 |

(Continued)

*Primary Examiner* — Edward Kim
(74) *Attorney, Agent, or Firm* — Thomas | Horstemeyer, LLP

(57) ABSTRACT

Disclosed are various embodiments for speculatively generating network page components to reduce network page generation latency. A request for a network page is received. Speculative generation is initiated for multiple network page components that are capable of being included in the network page. A subset of the speculatively generated network page components that will actually be included in the network page is determined. The network page is then generated, where the subset of the speculatively generated network page components are included in the network page and others of the speculatively generated network page components are excluded from the network page.

20 Claims, 6 Drawing Sheets

(56) References Cited

U.S. PATENT DOCUMENTS

| | | | | |
|---|---|---|---|---|
| 7,627,813 B2* | 12/2009 | Roser | G06F 17/30905 | 715/234 |
| 7,752,258 B2* | 7/2010 | Lewin | G06F 17/30902 | 709/203 |
| 8,082,133 B2* | 12/2011 | Watte | A63F 13/12 | 703/6 |
| 8,136,089 B2* | 3/2012 | Snodgrass | G06F 17/30893 | 707/721 |
| 8,166,079 B2* | 4/2012 | Lewin | G06F 17/30902 | 707/803 |
| 8,341,245 B1* | 12/2012 | Roskind | H04L 67/2847 | 709/219 |
| 2001/0044832 A1* | 11/2001 | Cohn | H04L 29/06 | 709/217 |
| 2002/0010625 A1* | 1/2002 | Smith | G06Q 30/02 | 705/14.52 |
| 2002/0023145 A1* | 2/2002 | Orr | G06F 17/30902 | 709/219 |
| 2003/0182357 A1* | 9/2003 | Chess | G06F 17/30902 | 709/203 |
| 2004/0098486 A1* | 5/2004 | Gu | G06F 17/30902 | 709/228 |
| 2007/0118639 A1* | 5/2007 | Bellifemine | H04L 29/06 | 709/224 |
| 2008/0114866 A1* | 5/2008 | Round | G06F 9/50 | 709/223 |
| 2008/0222268 A1* | 9/2008 | Miyamoto | H04L 67/02 | 709/217 |
| 2009/0043597 A1* | 2/2009 | Agarwal | G06Q 30/0207 | 705/14.1 |
| 2009/0150518 A1* | 6/2009 | Lewin | H04L 67/2842 | 709/219 |
| 2010/0312858 A1* | 12/2010 | Mickens | G06F 17/30902 | 709/219 |
| 2011/0196921 A1* | 8/2011 | Sylthe | G06F 17/30905 | 709/203 |
| 2011/0202424 A1* | 8/2011 | Chun | G06F 3/0481 | 705/26.8 |

\* cited by examiner

SPECULATIVE GENERATION OF NETWORK PAGE COMPONENTS

CROSS-REFERENCE TO RELATED APPLICATION

This application is a continuation of, and claims priority to, U.S. patent application entitled "SPECULATIVE GENERATION OF NETWORK PAGE COMPONENTS," filed on Feb. 20, 2012, and assigned application Ser. No. 13/400, 287, and which claims priority to, and the benefit of, U.S. Provisional Patent Application entitled, "SPECULATIVE GENERATION OF NETWORK PAGE COMPONENTS," having Ser. No. 61/533,889, filed on Sep. 13, 2011, both of which are incorporated by reference in their entirety.

BACKGROUND

Model-view-controller (MVC) refers to an architectural pattern in software engineering. The controller obtains user input, which is provided to the model. The model performs some calculation using the input. The model may include data along with the logic used to manipulate the data. When the model has completed performing the calculation, an appropriate view is generated. The view typically corresponds to a user interface component.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to the speculative generation of network page components. The time it takes to generate a network page is an important variable in determining the experience of users. As a non-limiting example, latency in network page generation may be correlated with sales conversion with respect to network sites for online retailers. That is, increased latency may result in fewer sales, while lower latency may result in increased sales. Network pages often incorporate numerous page components that may be generated in parallel to reduce latency. However, the model-view-controller (MVC) architecture often employed in network page generation pipelines presents serious shortcomings with respect to latency. For example, the view is not generated until the model completes processing because the identity of the specific view is not known until then.

Various embodiments of the present disclosure reduce latency in network page generation by speculatively generating alternative components which may be included within the network page. Although the particular component (or view) which is to be included within the network page may not be immediately known, various user and environmental information may be employed to determine a set of potential components that may be included. The analysis to determine the set may be performed before obtaining a request for the network page. The potential components in the set may then be generated in parallel upon obtaining a request for the network page. By the time the identity of the actual component is known after application processing of the network page request is completed, generation of the component may be already underway or even finished, thereby improving page generation speed. In the following discussion, a general description of the system and its components is provided, followed by a discussion of the operation of the same.

Figure 1:
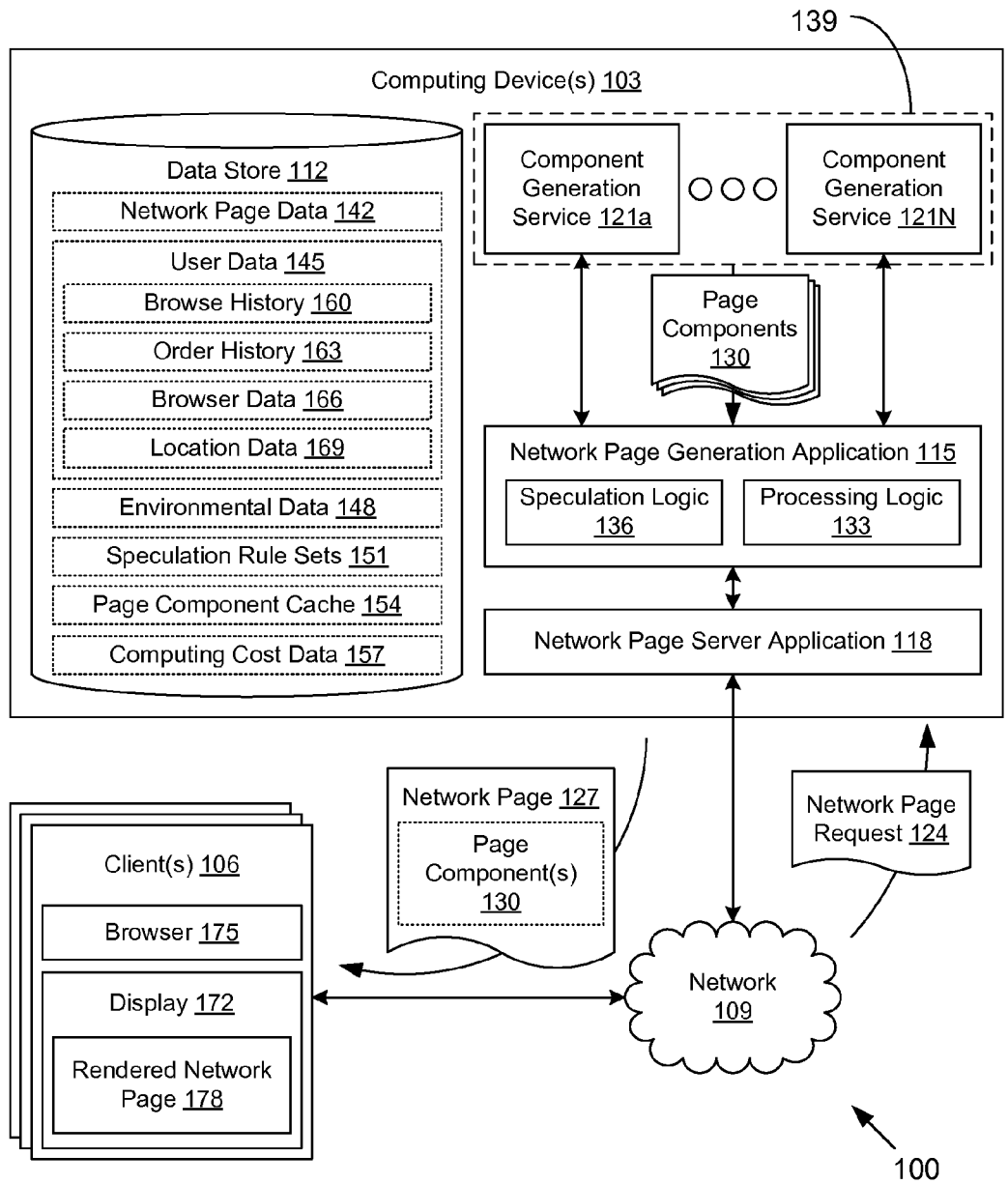
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page generation application 115, a network page server application 118, a plurality of component generation services 121a . . . 121N, and other applications, services, processes, systems, engines, or functionality not discussed in detail herein. The network page generation application 115 is executed to process network page requests 124 obtained from clients 106 and to generate network pages 127 in response. The network page request 124 may correspond to a hypertext transfer protocol (HTTP)

resource request or another type of request. The network pages 127, which may correspond to web pages, gopher pages, and/or other forms of network content, may include one or more page components 130 that are generated separately by component generation services 121. The network pages 127 may include hypertext markup language (HTML), extensible markup language (XML), JavaScript®, VBScript®, Java®, Flash®, and/or other interpreted or executable code.

The network page generation application 115 may include, for example, processing logic 133, speculation logic 136, and/or other components. The processing logic 133 is configured to process the network page request 124 and potentially other data to generate the network page 127. As the network page 127 may include various page components 130, the processing logic 133 may be configured to select the page components 130 that will be included in the network page 127. In various scenarios, it may not be known a priori which page components 130 should be included in the network page 127. Accordingly, without speculation logic 136, the network page generation application 115 waits for the processing logic 133 to identify the correct page components 130 before generation of the page components 130 commences.

By contrast, the speculation logic 136 is configured to speculate on which page components 130 might be included in a network page 127. This speculation may be based on various data available to the speculation logic 136 upon receiving the network page request 124 or before receiving the network page request 124. In some scenarios, the speculation logic 136 may identify all page components 130 which may possibly be included in a particular network page 127 such as those representing a deterministic set. Upon receiving the network page request 124 from a user, the speculation logic 136 commences generation of at least some of the possible page components 130. By commencing generation of the page components 130 in advance of knowing precisely which one(s) will be used, latency associated with page generation is thereby reduced.

The network page server application 118 is executed to obtain the network page requests 124 from clients 106 over the network 109 and serve up the network pages 127 to the clients 106. Where the network page 127 is dynamically generated, the network page server application 118 interfaces with the network page generation application 115 to obtain the dynamically generated network page 127. In various embodiments, the network page server application 118 may comprise a commercially available HTTP server such as, for example, Apache® HTTP Server, Apache® Tomcat®, Microsoft® Internet Information Services (IIS), and so on.

The component generation services 121 are each configured to generate page components 130. To this end, the component generation services 121 may gather data from the data store 112 to generate the page components 130. In some cases, the component generation services 121 may be configured to obtain pre-generated page components 130 from the data store 112 if available. However, many page components 130 may be dynamic and dependent at least in part on currently available data, so it may be desirable not to generate page components 130 in advance. The page components 130 may correspond to visible and/or invisible portions of the network page 127. One or more of the component generation services 121 may be executed in an elastic computing resource 139, which will be described in further detail below.

The data stored in the data store 112 includes, for example, network page data 142, user data 145, environmental data 148, speculation rule sets 151, a page component cache 154, computing cost data 157, and potentially other data. The network page data 142 includes various data that may be employed in the generation of network pages 127 and page components 130. For example, the network page data 142 may include text, code, templates, images, applets, audio, video, and/or other data.

The user data 145 may include various data about users. For example, the user data 145 may include a browse history 160, order history 163, browser data 166, location data 169, information indicating relative importance of the user, and/or other data. The browse history 160 may describe the various network pages 127 and page components 130 that the user has viewed and/or requested previously. The order history 163 may describe one or more orders by the customer for products, downloads, services, etc. through one or more network sites or companies. The browser data 166 may describe types of clients 106 and/or browsers that the user has previously employed, or is currently employing, to request network pages 127. The location data 169 may identify a current location of the user, previous locations of the user, shipping addresses, billing addresses, and/or other locations.

The environmental data 148 includes various data about the environment of the network page request 124. For example, the environmental data 148 may indicate a current time, a current load for the computing devices 103, predicted latencies for generation of page components 130, and/or other data. The speculation rule sets 151 each define one or more rules used to select potential page components 130 that are speculatively generated in response to a network page request 124. The speculation rule sets 151 may include rules that are specific to certain users and/or applicable to a group of users or all users.

The page component cache 154 is employed to cache pre-generated page components 130. Such page components 130 may be speculatively pre-generated or pre-generated in response to network page requests 124. The computing cost data 157 indicates current and/or projected costs for computing capacity in the elastic computing resource 139. Also, as there may be multiple providers of elastic computing resources 139, the computing cost data 157 may facilitate a cost comparison among the multiple elastic computing resources 139.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 172. The display 172 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 175 and/or other applications. The browser 175 may be executed in a client 106, for example, to access and render network pages, such as web pages, or other network content served up by the computing device 103 and/or other servers, thereby generating a rendered network page 178 on the display 172. The client 106 may be configured to execute applications beyond browser 175 such as, for example, mobile applications, email applications, instant message applications, and/or other applications.

Figure 2:
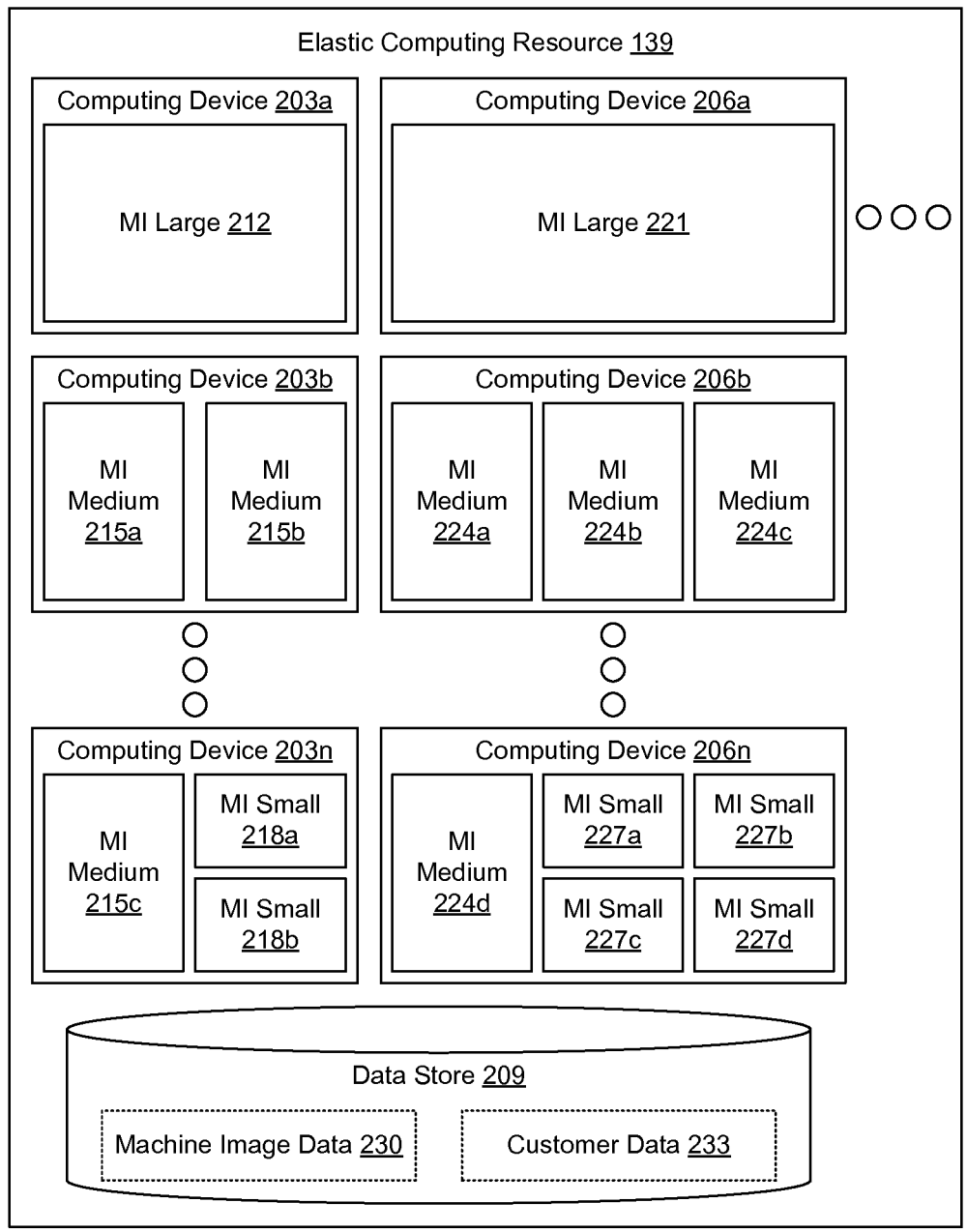
FIG. 2 is a drawing of an elastic computing resource employed in the networked environment of FIG. 1 according to various embodiments of the present disclosure.

Turning now to FIG. 2, shown is one example of an elastic computing resource 139 according to various embodiments. The elastic computing resource 139 includes a plurality of computing devices 203a, 203b . . . 203n, a plurality of computing devices 206a, 206b . . . 206n, and a data store 209. Such components of the elastic computing resource 139 may be in data communication with each other and/or external computing devices 103 (FIG. 1) by way of a network 109 (FIG. 1). Such computing devices 203 and 206 may be located in a single installation or may be dispersed among many different geographical locations.

Computing devices 203 and 206 may correspond to differing hardware platforms in various embodiments. Accordingly, computing devices 203 and 206 may have differing hardware configurations, for example, of central processing units (CPUs), system memory, data storage, network bandwidth, and/or other hardware characteristics. In one embodiment, all computing devices 203a, 203b . . . 203n may have a first hardware configuration, while all computing devices 206a, 206b . . . 206n may have a second hardware configuration. Although only two sets of computing devices 203 and 206 are shown, it is understood that there may be any number of sets of computing devices 203 and 206 having different hardware configurations.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 500 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n. One MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer (e.g., the speculation logic 136 (FIG. 1)), though any customer may be associated with any number of machine instances.

In various embodiments, the speculation logic 136 may be capable of launching new machine instances and/or terminating machine instances dynamically. Thus, the elastic computing resource 139 may provide elastic computing capability that can vary over time. The cost associated with computing capacity may vary over time as well in a spot market for computing capacity. If there is excessive extra capacity in the elastic computing resource 139, the spot market price may be relatively low. By contrast, during time periods of peak demand, the spot market price may be relatively high. Further, there may be multiple providers of elastic computing resources 139, and the price for computing capacity may vary among the providers.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. However, it is understood that in some embodiments customer-specific data may be stored within local data storage associated with a machine instance.

Next, referring back to FIG. 1, a general description of the operation of the various components of the networked environment 100 is provided. To begin, a user may interact with a network site served up by the network page server application 118 such that various user data 145 is collected and stored. Where the network site corresponds to that of an online retailer, an order history 163 for the user may be created. The network page server application 118 may be configured to record the types of browser 175, client 106 device, and/or other information in the browser data 166. The internet protocol (IP) address of the user and/or other location information may be stored in the location data 169.

The speculation logic 136 determines, for a given network page 127, what page components 130 could possibly be included in the network page 127. This determination may be applicable for all users and/or may be customized for specific users based at least in part on the user data 145 and/or environmental data 148. As a non-limiting example, the speculation logic 136 may perform additional speculation (i.e., generate additional components in advance) for users having a relatively higher importance. As a factor, the importance of the user may dominate the computing cost in some cases. The analysis performed by the speculation logic 136 may be conducted before receiving a network page request 124 to avoid delay. In some embodiments, the analysis may be governed by one or more speculation rule sets 151, which may be customized for specific users or applicable to all users.

At some point, a user at a client 106 uses a browser 175 to send a network page request 124 over the network 109 to the network page server application 118. The network page server application 118 provides the network page request 124 to the network page generation application 115. The processing logic 133 of the network page generation application 115 begins processing the network page request 124 to generate a network page 127. The network page request 124 may include various information such as referring network page 127, information about the browser 175 and operating system of the client 106, IP address, cookies, unique identifiers for users, session identifiers, and so on.

As a non-limiting example, the network page 127 may correspond to a detail page for a product. Various page components 130 for the detail page may include, for example, a product description component, a customer reviews component, a similar products component, and so on. Certain page components 130 may be omitted if the customer is using a mobile device with a small display 172. Certain page components 130 may be customized for the specific user based on user data 145.

It may take a relatively long time for the processing logic 133 to determine precisely which page components 130 will be included in the network page 127. The page components 130 correspond to portions of the network page 127 which are separately generated by other component generation services 121. In order to improve page generation response time, the speculation logic 136 initiates generation of at least some of the possible page components 130 in response to receiving the network page request 124 but before the processing logic 133 has made a decision as to which page components to generate. The generation may be performed in parallel, in sequence, or in a combination of both. The possible page components 130 that are speculatively generated may be identified based at least in part on data available in the network page request 124.

As used herein, alternative views or renderings of the same page component 130 may be considered to be different page components 130 for the purposes of speculative generation. As a non-limiting example, multiple different renderings of a promotional campaign may be speculatively generated in advance of knowing which promotional campaigns that the user has already viewed. Once it is determined which promotional campaigns have been presented to the user, it may be that only a promotional campaign that the user has not already seen will be included in the network page 127 as a page component 130.

The speculation logic 136 may be configured to assign a respective probability to each page component 130 which corresponds to the likelihood that the page component 130 will be selected. The probability may be used to prioritize generation of page components 130 such that the page components 130 that are highly likely to be selected will be given priority for advance generation. The page components 130 may be prioritized in other ways as well. For example, page components 130 that may be generated relatively quickly may be given a higher priority because they will finish sooner, thereby enabling other page components 130 to be generated. Alternatively, page components 130 that may be generated relatively slowly may be given a higher priority so that their generation is commenced earlier.

External factors may affect the bandwidth or capacity of the page component 130 generation by the component generation services 121. In one embodiment, the component generation services 121 may be executed in an elastic computing resource 139. Depending on a current cost for computing capacity, which is available in the computing cost data 157, the speculation logic 136 may engage in more or less speculation. Consequently, when computing capacity is relatively cheap, the speculation logic 136 may launch generation of all possible page components 130 in parallel. When computing capacity is relatively more expensive, one or more of the page components 130 may be generated in sequence or may not even be pre-generated at all. The speculation logic 136 or other logic may be configured to increase or decrease the numbers of machine instances executed in the elastic computing resource 139 that are used for the component generation services 121.

During generation of the page components 130, or after generation of the page components 130, the processing logic 133 completes its identification or selection of page components 130. At this point, the page components 130 that will be used will be allowed to complete generation, if they have not already completed generation. The page components 130 that will not be used may be discarded if they have already been generated, or their generation may be interrupted. In one embodiment, the page components 130 that will not be used may be permitted to complete generation, with the results being stored in the page component cache 154. The processing logic 133 obtains the page components 130 and finishes generating the network page 127, which is then returned to the client 106 over the network 109.

After identification of the page components 130 that will be used, the speculation logic 136 may update the appropriate speculation rule set 151 to refine one or more rules. This feedback allows the rules to become better at identifying the possible page components 130 for a network page 127 given a user and a network page request 124. The feedback may limit speculative generation of certain page components 130 or perhaps assign lower probabilities or priorities to certain page components 130. Conversely, the feedback may be used to increase the probabilities or priorities for other page components 130. Also, trends that are associated with certain time periods may be identified and employed to create new speculation rules.

Figure 3:
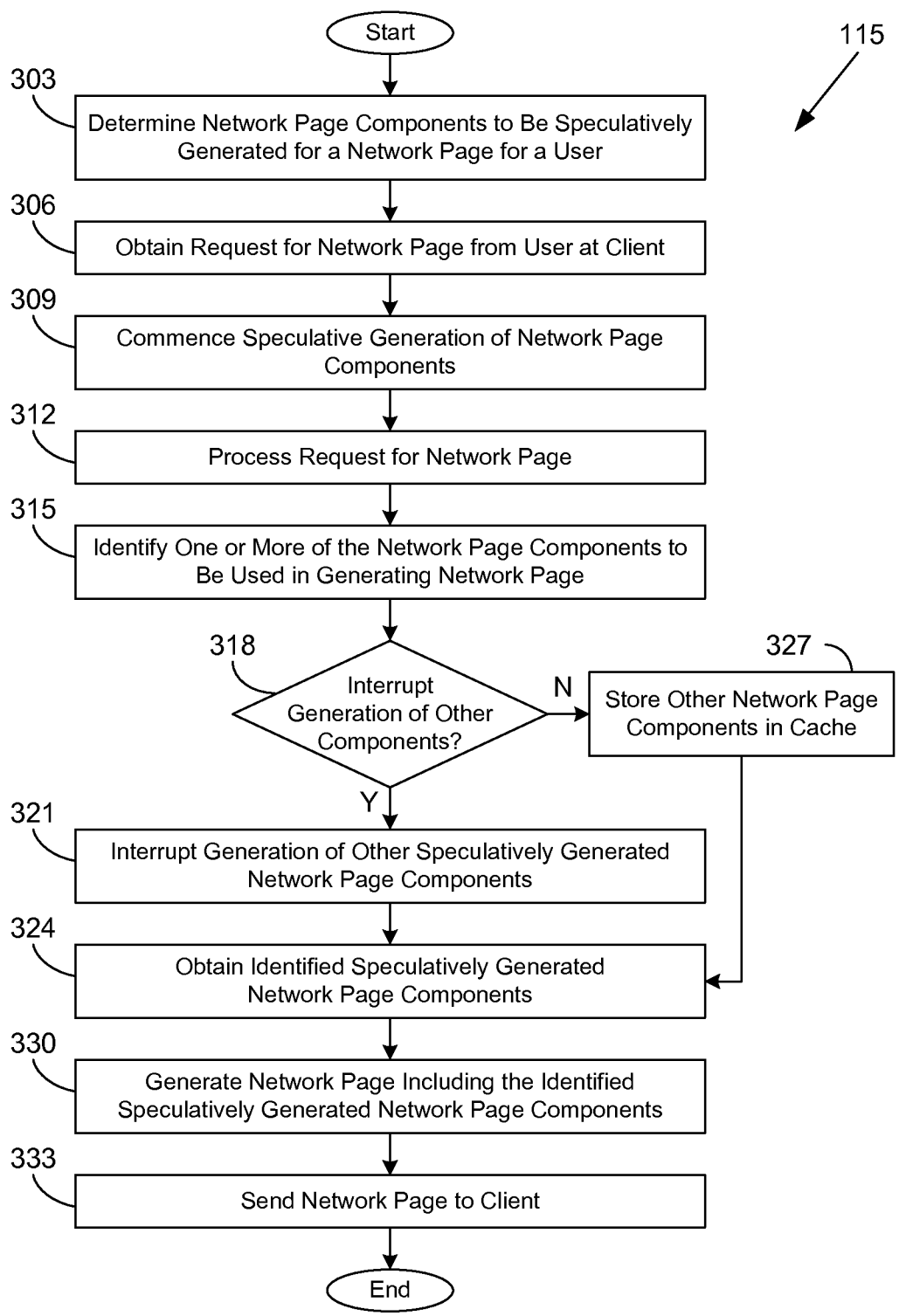
FIGS. 3 and 4 are flowcharts illustrating examples of functionality implemented as portions of a network page generation application executed in a computing device in the networked environment of FIG. 1 according to various embodiments of the present disclosure.

Referring next to FIG. 3, shown is a flowchart that provides one example of the operation of a portion of the network page generation application 115 according to various embodiments. It is understood that the flowchart of FIG. 3 provides merely an example of the many different types of functional arrangements that may be employed to implement the operation of the portion of the network page generation application 115 as described herein. As an alternative, the flowchart of FIG. 3 may be viewed as depicting an example of steps of a method implemented in the computing device 103 (FIG. 1) according to one or more embodiments.

Beginning with box 303, the network page generation application 115 determines the page components 130 (FIG. 1) that may be speculatively generated for inclusion in a network page 127 (FIG. 1) generated for a user. The user may be an identified user or an anonymous user. In box 306, the network page generation application 115 obtains a network page request 124 (FIG. 1) from the user at a client 106 (FIG. 1) by way of the network 109 (FIG. 1). In box 309, the network page generation application 115 commences speculative generation of some or all of the page components 130 determined from box 303. In box 312, the network page generation application 115 processes the network page request 124 using the processing logic 133 (FIG. 1).

In box 315, the processing logic 133 of the network page generation application 115 identifies one or more of the page components 130 that will actually be used in generating the network page 127. In some cases, none of the page components 130 will actually be used in generating the network page 127. In box 318, the network page generation application 115 determines whether to interrupt the generation of the other page components 130 that were speculatively generated but will not be used. If the generation of the other page components 130 is to be interrupted, the network page generation application 115 moves to box 321 and interrupts the generation of the other speculatively generated page components 130. The network page generation application 115 then continues to box 324.

If the network page generation application 115 instead determines in box 318 that the generation of the other page components 130 is not to be interrupted, the network page generation application 115 transitions from box 318 to box 327. In box 327, the network page generation application 115 allows the generation of the page components 130 to complete and then stores one or more of the other page components 130 in the page component cache 154 (FIG. 1). The network page generation application 115 then proceeds to box 324.

In box 324, the network page generation application 115 obtains the speculatively generated page components 130 that were identified in box 315. In box 330, the network page generation application 115 generates the network page 127, which includes the identified page components 130. In box 333, the network page generation application 115 sends the network page 127 to the client 106 by way of the network 109. It is noted that the network page generation application 115 may begin sending data for the network page 127 to the client 106 before the network page 127 has been fully generated. As a non-limiting example, the network page generation application 115 may immediately return the header of the network page 127 to the client 106, which may occur before the identified page components 130 are fully generated. Thereafter, the portion of the network page generation application 115 ends.

Figure 4:
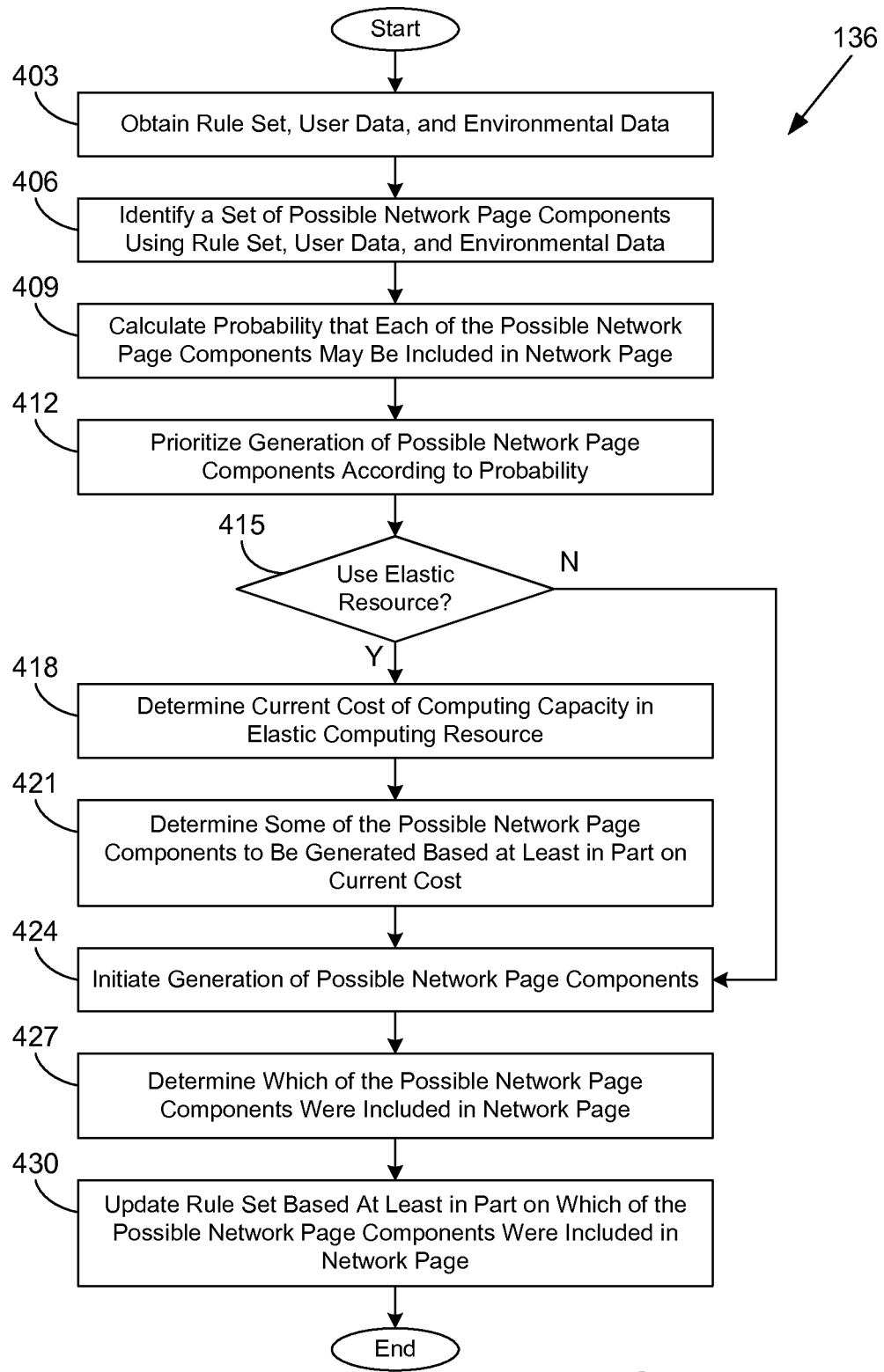

Moving on to FIG. 4, shown is a flowchart that provides one example of the operation of a portion of the speculation logic 136 of the network page generation application 115 (FIG. 1) according to various embodiments. It is understood that the flowchart of FIG. 4 provides merely an example of the many different types of functional arrangements that may be employed to implement the operation of the portion of the speculation logic 136 as described herein. As an alternative, the flowchart of FIG. 4 may be viewed as depicting an example of steps of a method implemented in the computing device 103 (FIG. 1) according to one or more embodiments.

Beginning with box 403, the speculation logic 136 obtains a speculation rule set 151 (FIG. 1), user data 145 (FIG. 1), and/or environmental data 148 (FIG. 1). In box 406, the speculation logic 136 identifies a set of possible page components 130 (FIG. 1) for a particular network page 127 (FIG. 1) using the speculation rule set 151, the user data 145, and/or the environmental data 148. In one embodiment, the set of possible page components 130 corresponds to a deterministic set of all of the page components 130 that may possibly be generated in conjunction with generating the particular network page 127.

In box 409, the speculation logic 136 calculates a corresponding probability that each respective one of the possible page components 130 may be included in the network page 127. In box 412, the speculation logic 136 prioritizes the generation of the possible page components 130 according to the corresponding probabilities. In addition, the generation of the possible page components 130 may be prioritized by shortest expected generation time, longest expected generation time, and/or other factors.

In box 415, the speculation logic 136 determines whether an elastic computing resource 139 (FIG. 1) is to be employed in speculatively generating the page components 130. If an elastic computing resource 139 is to be employed, the speculation logic 136 continues to box 418. In box 418, the speculation logic 136 determines the current cost of computing capacity in the elastic computing resource 139 from the computing cost data 157 (FIG. 1). In one embodiment, the current cost is reflective of the price of computing capacity in a spot market for computing capacity in the elastic computing resource 139.

In box 421, the speculation logic 136 determines some of the possible page components 130 to be generated based at least in part on the current cost. In other words, if the cost is relatively low for computing capacity in the elastic computing resource 139, the speculation logic 136 may choose to generate all of the page components 130 in parallel. If the cost is higher, the speculation logic 136 may choose to speculatively generate page components 130 with a relatively higher priority. In some cases, one or more of the page components 130 may not be generated speculatively, or perhaps not generated speculatively in parallel, which may result in a delay. Depending on the current cost, the speculation logic 136 may be configured to increase or decrease the number of machine instances assigned to the component generation services 121 (FIG. 1) in the elastic computing resource 139. The speculation logic 136 continues to box 424. If the speculation logic 136 instead determines in box 415 that an elastic computing resource 139 is not employed, the speculation logic 136 transitions from box 415 to box 424.

In box 424, the speculation logic 136 initiates generation of some or all of the possible page components 130. To this end, the speculation logic 136 may send generation requests to one or more of the component generation services 121, potentially in parallel. In box 427, the speculation logic 136 determines which of the possible page components 130 were in fact included in the network page 127 by the processing logic 133 (FIG. 1). In box 430, the speculation logic 136 updates the appropriate speculation rule set 151 based at least in part on which of the possible page components 130 were actually included in the network page 127. Additionally, the speculation logic 136 may update the speculation rule set 151 based at least in part on the actual computing cost associated with generating the page components 130. The speculation logic 136 may have fallen short of, or may have exceeded, a budget for computing cost, and the actual computing cost may be used to cause more or less speculation in the future as a result. Thereafter, the portion of the speculation logic 136 ends.

Figure 5:
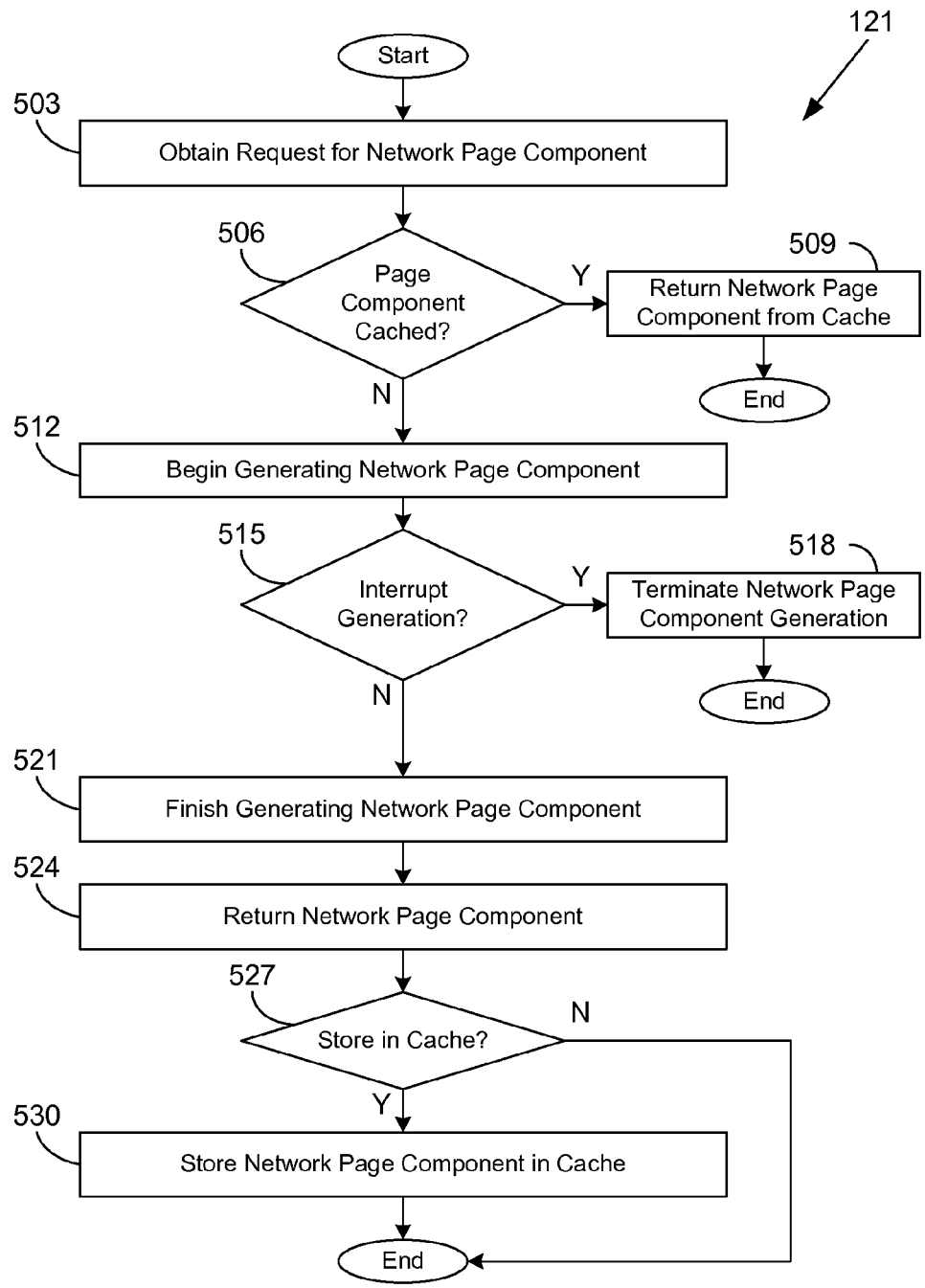
FIG. 5 is a flowchart illustrating one example of functionality implemented as portions of a component generation service executed in a computing device in the networked environment of FIG. 1 according to various embodiments of the present disclosure.

Continuing now to FIG. 5, shown is a flowchart that provides one example of the operation of a portion of the component generation service 121 according to various embodiments. It is understood that the flowchart of FIG. 5 provides merely an example of the many different types of functional arrangements that may be employed to implement the operation of the portion of the component generation service 121 as described herein. As an alternative, the flowchart of FIG. 5 may be viewed as depicting an example of steps of a method implemented in the computing device 103 (FIG. 1) according to one or more embodiments.

Beginning with box 503, the component generation service 121 obtains a request for a page component 130 (FIG. 1) from the network page generation application 115 (FIG. 1). For example, the request may be generated by the speculation logic 136 (FIG. 1) of the network page generation application 115. In box 506, the component generation service 121 determines whether the page component 130 is stored in the page component cache 154 (FIG. 1). If the page component 130 is cached, the component generation service 121 returns the page component 130 from the page component cache 154 in box 509. Thereafter, the portion of the component generation service 121 ends.

Otherwise, if the component generation service 121 determines in box 506 that the page component 130 is not cached (or if a cached version is invalid or out-of-date), the component generation service 121 proceeds from box 506 to box 512. In box 512, the component generation service 121 begins generating the page component 130. In box 515, the component generation service 121 determines whether generation of the page component 130 is to be interrupted. For example, the processing logic 133 (FIG. 1) may determine that a page component 130 that is being speculatively generated is not to be included in a network page 127 (FIG. 1). If generation of the page component 130 is to be interrupted, the component generation service 121 terminates page component generation 130 in box 518. Thereafter, the portion of the component generation service 121 ends.

If the component generation service 121 instead determines in box 515 that generation of the page component 130 is not to be interrupted, the component generation service 121 proceeds from box 515 to box 521 and finishes generation of the page component 130. In box 524, the component generation service 121 returns the page component 130, for example, to the network page generation application 115. In box 527, the component generation service 121 determines whether the page component 130 is to be stored in the page component cache 154. If the page component 130 is to be cached, the component generation service 121 stores the page component 130 in the page component cache 154 in box 530. Thereafter, the portion of the component generation service 121 ends. If the component generation service 121 determines in box 527 that the page component 130 is not to be cached, the portion of the component generation service 121 also ends.

Figure 6:
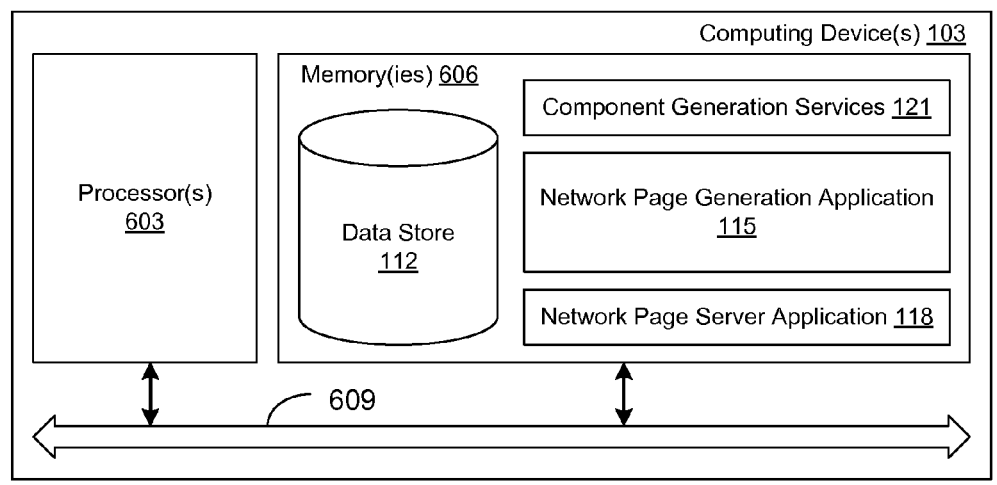
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the component generation services 121, the network page generation application 115, the network page server application 118, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the component generation services 121, the network page generation application 115, the network page server application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the network page generation application 115 and the component generation services 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the component generation services 121, the network page generation application 115, and the network page server application 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

determine a plurality of network page components that are capable of being included in a network page;

calculate a respective probability that individual ones of the plurality of network page components will actually be selected for inclusion in the network page;

initiate a speculative generation of the plurality of network page components in response to receiving a request for the network page, wherein the speculative generation is prioritized for the individual ones of the plurality of network page components based at least in part on the respective probability, and the speculative generation is speculative in that generation of the plurality of network page components is initiated despite an uncertain probability as to whether one or more of the plurality of network page components will actually be selected for inclusion in the network page;

select a subset of the plurality of network page components after initiating the speculative generation, the subset of the plurality of network page components being identified by data processing that has not concluded until after the speculative generation is initiated; and generate the network page, the network page including the subset of the plurality of network page components and excluding at least one of the plurality of network page components for which the speculative generation was initiated.

2. The non-transitory computer-readable medium of claim 1, wherein an identity of the subset of the plurality of network page components is unknown when the speculative generation is initiated.

3. The non-transitory computer-readable medium of claim 1, wherein when executed the program further causes the at least one computing device to at least store the at least one of the plurality of network page components in a cache in response to a completion of the speculative generation of the at least one of the plurality of network page components.

4. The non-transitory computer-readable medium of claim 1, wherein at least some of the plurality of network page components are alternatives to one another.

5. The non-transitory computer-readable medium of claim 1, wherein when executed the program further causes the at least one computing device to at least terminate the speculative generation of the plurality of network page components other than the subset of the plurality of network page components.

6. The non-transitory computer-readable medium of claim 1, wherein the plurality of network page components are determined based at least in part on user data.

7. The non-transitory computer-readable medium of claim 1, wherein the speculative generation is prioritized for the individual ones of the plurality of network page components further based at least in part on an expected generation time length.

8. A system, comprising:
    at least one computing device; and
    at least one application executed in the at least one computing device, wherein when executed the at least one application causes the at least one computing device to at least:
        determine a plurality of network page components that are capable of being included in a network page;
        calculate a respective probability that individual ones of the plurality of network page components will actually be selected for inclusion in the network page;
        initiate a speculative generation of the plurality of network page components in response to receiving a request for the network page, wherein the speculative generation is prioritized for the individual ones of the plurality of network page components based at least in part on the respective probability, and the speculative generation is speculative in that generation of the plurality of network page components is initiated despite an uncertain probability as to whether one or more of the plurality of network page components will actually be selected for inclusion in the network page;
        select a subset of the plurality of network page components that are to be included in the network page, the subset of the plurality of network page components being identified by data processing that has not concluded until after the speculative generation is initiated; and
        terminate the speculative generation of at least one of the plurality of network page components that are to be excluded from the network page.

9. The system of claim 8, wherein the plurality of network page components are determined based at least in part on environmental data.

10. The system of claim 8, wherein the plurality of network page components are determined based at least in part on a computing cost associated with generating the plurality of network page components.

11. The system of claim 8, wherein the plurality of network page components are determined based at least in part on a set of rules, and when executed the at least one application further causes the at least one computing device to at least update the set of rules based at least in part on the subset of the plurality of network page components that is selected.

12. The system of claim 8, wherein the speculative generation is prioritized for the individual ones of the plurality of network page components further based at least in part on an expected generation time length.

13. A method, comprising:
    calculating, via at least one of one or more computing devices, a respective probability that individual ones of a plurality of network page components will actually be selected for inclusion in a network page;
    initiating, via at least one of the one or more computing devices, a speculative generation of the plurality of network page components that are capable of being included in the network page in response to receiving a request for the network page, wherein the speculative generation is prioritized for the individual ones of the plurality of network page components based at least in part on the respective probability, and the speculative generation is speculative in that generation of the plurality of network page components is initiated despite an uncertain probability as to whether one or more of the plurality of network page components will actually be selected for inclusion in the network page;
    determining, via at least one of the one or more computing devices, a first subset of the plurality of network page components that will actually be included in the network page, the first subset of the plurality of network page components being identified by data processing that has not concluded until after the speculative generation is initiated; and
    generating, via at least one of the one or more computing devices, the network page, wherein the network page includes the first subset of the plurality of network page components and excludes a second subset of the plurality of network page components.

14. The method of claim 13, further comprising processing, via at least one of the one or more computing devices, the request for the network page in parallel with performing the speculative generation.

15. The method of claim 13, wherein determining the first subset of the plurality of network page components further comprises:
    performing, via at least one of the one or more computing devices, an initial processing of the request for the network page; and
    selecting, via at least one of the one or more computing devices, the first subset of the plurality of network page components from the plurality of network page components based at least in part on the initial processing of the request for the network page.

16. The method of claim 13, further comprising determining, via at least one of the one or more computing devices, the plurality of network page components based at least in part on at least one of: environmental data or user data.

17. The method of claim 13, further comprising interrupting, via at least one of the one or more computing devices, the speculative generation of the second subset of the plurality of network page components.

18. The method of claim 13, further comprising storing, via at least one of the one or more computing devices, the second subset of the plurality of network page components in a cache after the speculative generation has completed.

19. The method of claim 13, further comprising:
determining, via at least one of the one or more computing devices, a current cost associated with computing capacity in an elastic computing resource; and
determining, via at least one of the one or more computing devices, the plurality of network page components to be speculatively generated based at least in part on the current cost.

20. The method of claim 13, wherein the speculative generation is prioritized for the individual ones of the plurality of network page components further based at least in part on an expected generation time length.

* * * * *